United States Patent [19]
Harvey

[11] Patent Number: 5,141,796
[45] Date of Patent: Aug. 25, 1992

[54] TOWED ARRAY STREAMER

[75] Inventor: Anthony P. Harvey, Sydney, Australia

[73] Assignee: Plessey Australia Pty. Limited, Meadowbank, Australia

[21] Appl. No.: 446,096

[22] Filed: Dec. 5, 1989

[30] Foreign Application Priority Data

Dec. 9, 1988 [AU] Australia .................. PJ1898

[51] Int. Cl.⁵ .................. B32B 3/28; G09F 21/12
[52] U.S. Cl. .................. 428/167; 428/35.9; 428/36.2; 428/36.4; 428/36.91; 428/76; 428/114; 428/172; 428/196; 428/294; 40/215; 138/123; 138/124; 138/174; 174/101.5
[58] Field of Search ............ 428/35.2, 35.7, 35.9, 428/36.2, 36.3, 36.4, 36.91, 76, 156, 167, 114, 292, 294, 295, 67, 172, 188, 196, 304.4; 40/215; 138/115, 123, 124, 151, 174, 177; 174/101.5

[56] References Cited

U.S. PATENT DOCUMENTS

| 3,696,329 | 10/1972 | Hazelhurst | 340/7 R |
| 3,791,912 | 2/1974 | Allard | 428/294 |
| 4,343,333 | 8/1982 | Keister | 138/174 |
| 4,463,779 | 8/1984 | Wink et al. | 138/174 |

FOREIGN PATENT DOCUMENTS 2116358  7/1972  France .
606419   8/1948  United Kingdom .

Primary Examiner—Ellis P. Robinson
Assistant Examiner—Donald J. Loney
Attorney, Agent, or Firm—Cushman, Darby & Cushman

[57] ABSTRACT

A towed array streamer including a buoyant core, a data bearer layer, longitudinally positioned strain members and at least an outer jacket in which a strain member support has provided in it a series of longitudinally running grooves accommodating strain members to confine the position of the strain members in the streamer.

4 Claims, 1 Drawing Sheet

TOWED ARRAY STREAMER

BACKGROUND OF THE INVENTION

This invention relates to a towed array streamer and in particular it relates to a method of and means for supporting the strain members in such a streamer.

It is already known to construct towed array streamers to comprise a core, a series of longitudinally positioned strain members, a data-bearer layer and inner and outer jackets. A problem in towed streamers in general is to achieve correct positioning of the strain members, and the support of the strain members, to ensure that during winching and other handling of the streamer, the longitudinal stresses are correctly transmitted without displacing or damaging the strain members.

SUMMARY OF THE INVENTION

It is an object of this invention to provide a means for supporting the strain members of a towed array streamer, which will ensure correct positioning of the strain members and maintain them in their correct operative location, and it is a further object of the invention to provide a structure which will achieve effective supporting of the strain members in the streamer.

These objects are achieved by locating the strain members in a fluted strain member support into which the strain members are engaged and held in grooves formed by the flutes. This fluted strain member support can form the core itself, or it can be positioned outwardly of a core at a required location.

Thus, the strain members are laid longitudinally in grooves in the strain member support which may be extruded, and, may form the core and according to a typical construction where the core forms the strain member support, the strain member support is groove and the strain members are housed in the grooves. The data-bearer layer can be positioned to surround the core with an over-braid between core and the data-bearer layer, the inner jacket surrounding the data-bearer layer and itself encased within an outer jacket, but it is to be understood that this represents one form of the invention only.

Basically, the preferred form of the invention comprises a towed array streamer having a buoyant core, a data-bearer layer, longitudinally positioned strain members and at least an outer jacket, the streamer including a strain member support having a series of longitudinally running externally opening grooves accommodating the strain members.

The preferred method for manufacturing the towed array streamer of the present invention comprises placing the strain members into the grooves and confining the strain member in the grooves.

BRIEF DESCRIPTION OF THE DRAWING

In order, however, that the nature of the invention can be fully appreciated, this embodiment will now be described with reference to the accompanying drawing which shows one typical construction of a towed array streamer according to this invention, but it is to be clear that the invention is not necessarily to be limited to this particular form and can be varied as will be described later herein.

In the drawings.

DETAILED DESCRIPTION

Figure 1:
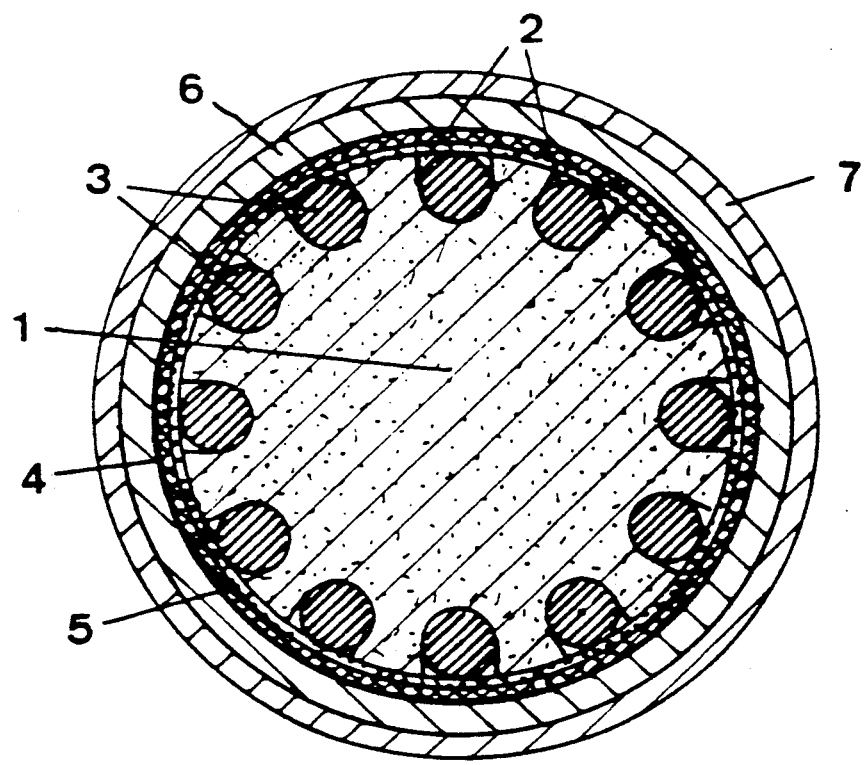
FIG. 1 is a transverse cross-sectional view of a preferred form of the towed array streamer of the present invention.
Figure 2:
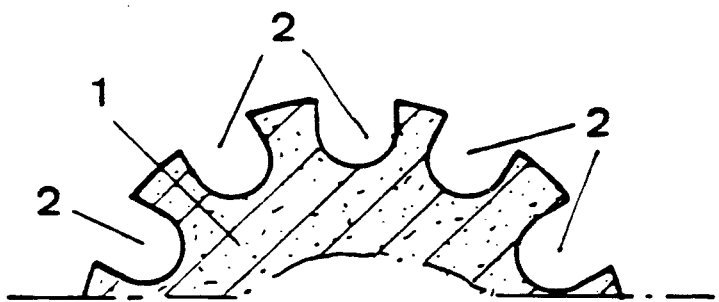
FIG. 2 is a transverse cross-sectional view of a portion of the strain member support thereof, showing the grooves for receiving the strain members.

The strain member support 1 forms the core of the cable and can be of any usual or approved form, having the required density to aid the buoyancy of the streamer. Formed to open radically outwardly from a plurality of locations distributed about the radially outer peripheral surface of the strain member support 1 is a series of grooves 2 each of a width dimension (measured in the circumferential direction of the towed array streamer) such that the strain members 3 (which are shown being generally circular in transverse cross-sectional shape) can be laid into the grooves 2 and will be retained in position in the grooves. Thus, the strain member support 1 has a fluted exterior.

The strain member support 1 and strain members 3 can thus be built up with the strain member 3 held in their correct location, and over the strain members support 1, with these strain members 3 in position, is placed the data-bearer layer 4, with or without an interposed layer 5 such as an over-braid of strain material such as that known under the trade name of "KEVLAR". The data-bearer layer on the interposed layer 5 retains the strain members in the grooves and thus forms retaining means.

The data-bearer layer 4 is formed to surround the strain member support 1 and the data-bearer layer 4, or the over-braid 5 (if provided), closes the grooves 2 so that the strain members 3 are retained within the grooves 2.

The inner jacket 6 is formed over the data-bearer layer 4 by extrusion or the like and over this inner jacket 6 is extruded the outer jacket 7.

It will, of course, be realized that this construction can apply to the entire length of a towed streamer, which streamer can comprise a leader section at the tow location, jointed to the two section, in turn joined to a forward vibration-isolation module, followed by an array section and terminating in an aft vibration isolation module and a tail, the various sections being joined by connectors through which the tension of the strain members is transferred. It should, however, be clear that the invention can be applied to any form of streamer which is arranged to be towed.

It will also be appreciated that, while in the illustration the strain member support 1 forms a solid core, the strain member support 1 can alternatively be provided as of an annular member surrounding, for instance, an inner data-bearer layer and a core. Regardless of the embodiment, in practicing the present invention the strain members are housed in grooves in a strain member support, whereby to effectively locate the strain members and to allow a ready method of manufacture of a towed streamer embodying longitudinally positioned strain members.

Any voids in the grooves or in other components such as the data bearer layer can be grease-filled.

The design provides a positive circumferential location of the strain members within the streamer core, and ensures improved mechanical keying between the jacket structure and the streamer strain members when the tow cable is mechanically handled on a representative handling device.

From the foregoing, it will be seen that this invention is an improvement on previously known towed array streamer constructions in that it provides a means for supporting the strain members which will ensure correct positioning of the strain members and maintaining them in their correct operating location. It is a further advantage of this invention that it will provide a structure which will achieve effective support of the strain members in the streamer.

What is claimed is:

1. A towed array streamer, comprising:
   a longitudinally elongated water-buoyant core having an outer peripheral surface extending thereabout;
   a radially outer peripherally extensive portion of said core providing a strain member support having provided in said outer peripheral surface a series of longitudinally extending, angularly spaced radially outwardly opening grooves;
   a plurality of strain members providing axial tensile strength to said streamer, each said strain member being received in and extending along a respective one of said grooves;
   a data-bearer layer operatively carried by said strain members on said strain member support;
   an outer jacket means wrapped about and thereby peripherally enclosing a combination of said strain members received in said grooves and said core, and said data-bearer layer.

2. The towed array streamer of claim 1, wherein:
   said strain member support forms an integral member with a radially innermost remainder of said core.

3. The towed array streamer of claim 1, wherein:
   said data-bearer layer is wrapped about and thereby peripherally enclosed said combination, being radially interposed between said combination and said outer jacket.

4. The towed array streamer of claim 3, further including:
   an over-braid layer radially interposed between said combination and said data-bearer layer.

* * * * *